No. 862,890. PATENTED AUG. 13, 1907.
W. E. FAULKINGHAM.
HUB ATTACHING DEVICE.
APPLICATION FILED FEB. 27, 1907.
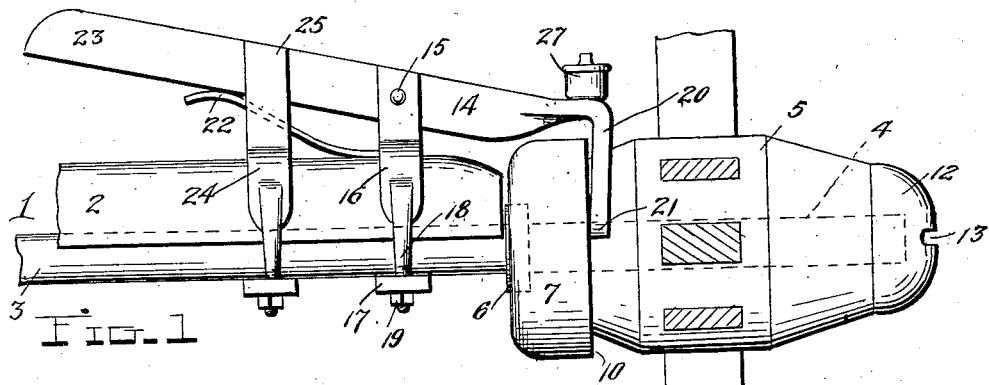
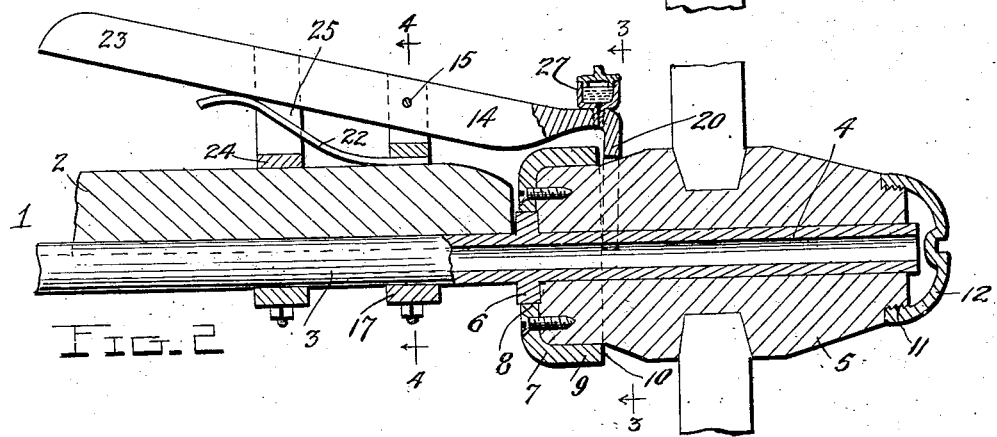
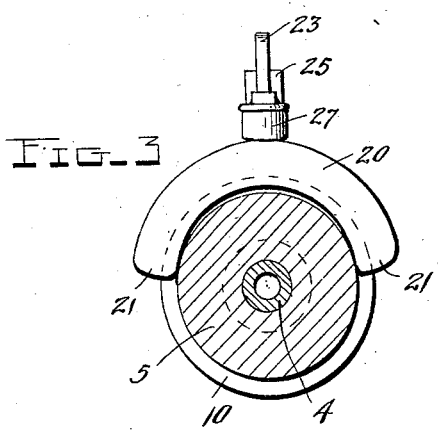
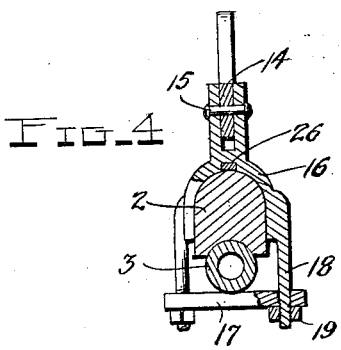
Witnesses
Inventor
William E. Faulkingham
By Watson E. Coleman
Attorney

UNITED STATES PATENT OFFICE.

WILLIAM E. FAULKINGHAM, OF JONESPORT, MAINE.

HUB-ATTACHING DEVICE.

No. 862,890.  Specification of Letters Patent.  Patented Aug. 13, 1907.

Application filed February 27, 1907. Serial No. 359,631.

*To all whom it may concern:*

Be it known that I, WILLIAM E. FAULKINGHAM, a citizen of the United States, residing at Jonesport, in the county of Washington and State of Maine, have invented certain new and useful Improvements in Hub-Attaching Devices, of which the following is a specification, reference being had therein to the accompanying drawing.

My invention relates to improvements in devices for attaching the hubs of vehicle wheels or the like, to their axles without the use of nuts and so that they may be quickly and easily applied to and removed from the axle spindles.

The object of the invention is to provide a device of this character which will be simple and inexpensive in construction, strong and durable in use and very effective for the purpose intended.

With the above and other objects in view, the invention consists in the novel construction, combination and arrangement of parts hereinafter fully described and claimed, and illustrated in the accompanying drawings, in which Figure 1 is a side elevation of a wheel hub and one end of an axle showing the application of my invention thereto; Fig. 2 is a vertical longitudinal section through the same; and Figs. 3 and 4 are vertical transverse sections taken respectively on the planes indicated by the lines 3—3 and 4—4 in Fig. 2.

Referring to the drawings by numeral, 1 denotes a portion of an axle of a vehicle or the like, consisting of an upper wooden member 2 and a tubular metal lower member 3. The outer end 4 of the latter forms the spindle for the wheel hub 5 and at the inner end of said spindle is provided an annular, radially-projecting flange 6. The wheel hub 5 is of the usual form and has secured upon the inner end of its wooden body a metal wear plate 7 in the form of a cap. The latter has a concentric opening 8 to receive the flange 6 upon the axle spindle and its outer portion forms an annular flange 9 which engages the outer surface of the hub and projects beyond the same so as to form an annular, radially-extending shoulder 10, the purpose of which will presently appear. The outer end of the hub 5 has a reduced threaded portion 11 upon which is removably secured a screw cap 12 formed in the center of its outer end with a transverse notch 13 to receive a screw driver or similar tool.

The hub is retained upon the axle spindle by a lever or dog 14 which is carried by the axle and has its outer end formed with a forked portion which straddles the top of the hub and engages the annular shoulder 10 of the wear plate 7 on the hub. This lever 14 is pivoted between its ends at 15 to the bifurcated upper end of a U-shaped clip 16 which straddles the upper member 2 of the axle, as clearly shown in Fig. 4. This clip is retained upon the axle by a cross plate 17 engaged with the bottom of the metal axle 3 and apertured to receive the depending threaded stems 18 which are formed upon the opposite sides of the body of the clip. Nuts 19 arranged upon the projecting lower ends of the stems 18 effectively clamp said parts upon the axle. The outer end of the lever 14, as before stated, is formed with a transversely extending forked end 20 which straddles the top of the hub. This end 20 is of substantially semi-circular shape, as shown in Fig. 3, and its two arms 21 are held in engagement with the annular shoulder 10 by a leaf spring 22 which forces the inner or handle end 23 of the lever upwardly. This spring 22 is arranged beneath the inner end of the lever and in a guide 24 which is in the form of a clip similar to the clip 16 and having a bifurcated upper end 25 to receive the spring and the lever and to guide the same in their swinging movement. The free end of the spring bears against the bottom edge of the lever and its opposite end is fixed in a seat 26 formed in the clip 16, as shown in Fig. 4. In order to prevent undue wear of the shoulder 10 and the jaws 21 of the lever, I provide upon the top of the end 20 of the lever, an oil cup 27 which is so arranged that it feeds oil or other lubricant to the shoulder 10 and the jaws engaged therewith, as clearly shown in Fig. 2.

From the foregoing it will be observed that the lever will effectively retain the hub of the wheel upon the axle without the necessity of nuts or other devices which tend to work loose and that the wheel may be readily removed for lubrication, repairs or the like, by simply depressing the handle end 23 of the lever sufficiently to free the jaws 21 from the shoulder 10 on the wear plate or cap 7 of the hub. It will be further noted that the device is of simple construction so that it may be produced and applied at a comparatively small cost and that there is little likelihood of its being readily damaged.

Having thus described my invention what I claim and desire to secure by Letters Patent is:—

1. The combination with an axle, of a wheel hub having an annular shoulder at its inner end, a pair of clips secured upon said axle, a lever pivoted in one of them and having a handle end guided by the other, a spring for actuating said lever, and a forked head upon the outer end of said lever adapted to straddle the hub and having jaws to engage said shoulder.

2. The combination with an axle, of a wheel hub having an annular shoulder at its inner end, a pair of clips secured upon said axle, a lever pivoted in one of them and having a handle end guided by the other, a spring for actuating said lever, a forked head upon the outer end of said lever to straddle said hub and having jaws to engage said shoulder, and an oil cup carried by said head for feeding lubricant to said shoulder and said jaws, substantially as shown and described.

3. The combination with an axle having an annular flange at the inner end of its spindle, of a wheel hub having a wear plate secured upon its inner end and apertured to receive said flange, said wear plate also having an annular shoulder, a spring actuated lever pivoted upon said axle and having at its outer end a forked head to straddle said hub and jaws to engage said shoulder, and means carried by said head of the lever for supplying lubricant to said shoulder and said jaws.

4. The combination with an axle, of a wheel hub thereon having an annular shoulder, and a spring pressed lever carried by the axle and having upon its outer end a forked head adapted to straddle the hub and formed with jaws to engage said annular shoulder on the hub at approximately diametrically opposite points, substantially as described.

5. The combination with an axle, of a wheel hub thereon having an annular shoulder, a spring pressed lever carried by the axle and having upon its outer end a projection or head adapted to engage said annular shoulder on the hub, and an oil cup carried by said head for lubricating it and said annular shoulder, substantially as described.

6. The combination with an axle, of a wheel hub having an annular shoulder, a pair of clips carried by said axle, a lever pivoted in one of them and having a handle end guided by the other, a spring for actuating said lever and a head upon the outer end of said lever to engage said annular shoulder on the hub.

7. The combination with an axle, of a wheel hub having an annular shoulder, a pair of clips each having a slotted upper end and a forked lower end to straddle said axle, said lower end being screw threaded, cross plates engaged with the axle and said threaded ends of the clips, nuts upon said threaded ends, a spring actuated lever pivoted in one of said clips and having a handle end guided by the other, and a head upon the outer end of said lever to engage said annular shoulder on the hub.

8. The combination with an axle having a radially projecting annular collar or flange adjacent to the inner end of its spindle, of a wooden hub surrounding said spindle, a dished wear plate secured upon the inner end of said hub and having a central circular opening for the reception of the collar or flange on the axle and an outwardly projecting annular flange forming an annular radially projecting shoulder upon said hub, and means upon said axle to engage said shoulder to retain the hub upon the axle.

In testimony whereof I hereunto affix my signature in presence of two witnesses.

WILLIAM E. FAULKINGHAM.

Witnesses:
E. B. SAWYER,
E. M. SAWYER.